United States Patent [19]
Hamilton et al.

[11] Patent Number: 5,397,842
[45] Date of Patent: Mar. 14, 1995

[54] POLYOLEFIN/SEGMENTED COPOLYMER BLEND AND PROCESS

[75] Inventors: Raymond G. Hamilton, Bensalem; Mark T. McCarty, Levittown, both of Pa.

[73] Assignee: Rohm and Haas Company, Philadelphia, Pa.

[21] Appl. No.: 981,561

[22] Filed: Nov. 25, 1992

Related U.S. Application Data

[63] Continuation-in-part of Ser. No. 747,555, Aug. 20, 1991, abandoned.

[51] Int. Cl.$^6$ ............................................. C08F 255/02
[52] U.S. Cl. .................................... 525/263; 525/265; 525/285; 525/279; 525/302; 525/309
[58] Field of Search ...................... 525/75, 70, 95, 263, 525/265, 279, 285, 302

[56] References Cited

U.S. PATENT DOCUMENTS

| | | | |
|---|---|---|---|
| 3,894,117 | 7/1975 | Agouri et al. | 525/95 |
| 3,903,203 | 9/1975 | Trieschmann et al. | 525/221 |
| 4,386,187 | 5/1983 | Grancio et al. | 525/96 |
| 4,396,654 | 8/1983 | Abe et al. | 428/35 |
| 4,490,508 | 12/1984 | Nagano et al. | 525/75 |
| 4,568,723 | 2/1986 | Lu | 525/92 |
| 4,632,959 | 12/1986 | Nagano | 525/70 |
| 4,647,509 | 3/1987 | Wallace | 428/474 |
| 4,690,976 | 9/1987 | Hahnfeld | 525/70 |
| 4,704,431 | 11/1987 | Stuart et al. | 525/75 |
| 4,705,823 | 11/1987 | Choi et al. | 524/474 |
| 4,716,197 | 12/1987 | Seiss et al. | 525/70 |
| 4,763,133 | 8/1988 | Takemura et al. | 343/912 |
| 4,839,423 | 6/1989 | Moriya et al. | 525/263 |
| 4,861,817 | 8/1989 | Erpelding et al. | 524/411 |
| 4,877,841 | 10/1989 | Moriya et al. | 525/263 |
| 4,957,974 | 9/1990 | Ilenda et al. | 525/301 |
| 5,130,376 | 7/1992 | Shib | 525/305 |
| 5,140,074 | 8/1992 | DeNicola, Jr. et al. | 525/263 |
| 5,166,240 | 11/1992 | Sakazume et al. | 525/70 |

FOREIGN PATENT DOCUMENTS

| | | |
|---|---|---|
| 873759 | 5/1979 | Belgium . |
| 195829A1 | 3/1985 | European Pat. Off. . |
| 328273A3 | 1/1989 | European Pat. Off. . |
| 437808A2 | 12/1990 | European Pat. Off. . |
| 1269103 | 6/1960 | France . |
| 229086 | 6/1990 | Japan . |
| 1469825 | 8/1973 | United Kingdom . |

OTHER PUBLICATIONS

English Translation for FR 12 69 103.

*Primary Examiner*—James J. Seidleck
*Assistant Examiner*—M. L. Warzel
*Attorney, Agent, or Firm*—Roger K. Graham

[57] ABSTRACT

A blend of a polyolefin, such as polypropylene, with a segmented copolymer containing both polyolefin segments and segments derived from greater than 20 to about 100% of a vinyl aromatic monomer is useful in applications where high melt strength is desired.

2 Claims, No Drawings

POLYOLEFIN/SEGMENTED COPOLYMER BLEND AND PROCESS

This application is a continuation-in-part of U.S. application Ser. No. 07/747,555, filed Aug. 20, 1991, now abandoned.

FIELD OF THE INVENTION

This invention relates broadly to a novel blend of a segmented copolymer and a polyolefin, the blend having high resistance to sagging without increasing melt viscosity, and to a method of making the same.

More particularly, the invention relates to a polymerized monoolefin having grafted thereto, by covalent bonding, a polymeric vinyl monomer chain having vinyl aromatic monomer units.

The invention further relates to a process wherein to the non-polar polyolefin, preferably polypropylene or polyethylene, is added a vinyl aromatic monomer which is to be grafted to the polyolefin such as styrene, methylstyrene, and the like, or mixtures of these with methyl methacrylate and/or butyl acrylate. An initiator is introduced with the monomer either in admixture or in separate feeds. The initiator may also be introduced after the monomer is introduced. The initiator has a one hour half life between about 110° to about 125° C. The vinyl monomer may act like a solvent to swell the polyolefin. Heating of this mixture may cause the polyolefin to become completely swollen, but there need be no equilibrium swelling reached prior to polymerization. Further heating will cause the grafting reaction to begin. An exothermic reaction occurs. The graft polymer is then blended with one or more suitable polyolefins such as polypropylene or polyethylene, and extruded or otherwise processed into a desired shape, which (for selected segmented copolymers) may be thermoformed with good resistance to sag.

BACKGROUND OF THE INVENTION

Non-polar polyolefins, especially polypropylene and polyethylene and mixtures in various low-density, high-density, and linear low-density form, are major articles of commerce for a wide variety of uses. Nevertheless, there exist specialty needs for which the marketplace has not provided a satisfactory answer. Among these are to overcome the difficulty of thermoforming and processing of the polyolefin, especially untilled, in a molten or semi-molten form (substantially above its melting point); the polymer tends to sag readily under its own weight because it exhibits an undesirably low stiffness, and to form shapes of grossly non-uniform thicknesses upon thermoforming. Attempts to correct this by increasing the molecular weight lead to difficulties in processing the higher molecular weight polymer not encountered with lower molecular weight polymers.

It is an object of this invention to provide blends of the segmented copolymer with a polyolefin matrix which exhibit improved physical performance in the melt, upon cooling, and in the solid state.

Further objects and advantages of this invention will appear as this specification progresses.

SUMMARY OF THE INVENTION

Broadly, the aforesaid objects and advantages are accomplished by copolymerizing onto a non-polar polyolefin trunk, at least one chain of a polymerized vinyl monomer present in a weight ratio with the polyolefin of from about 1:20 to 4:1. In the present invention, polyolefin refers to polymers derived from the polymerization or copolymerization of monoethylenically unsaturated olefins, such as ethylene, propylene, butene-l, and the like. Segmented copolymers containing blocks whose formal structure is that of a polyolefin, but where the block component is not formed by the direct polymerization (such as Ziegler-Natta catalyzed polymerization) of a monoolefin, are unsatisfactory for improving the melt strength of polyolefins.

The segmented copolymer is derived from above 20% of a vinyl aromatic monomer and up to less than 80%, preferably less than about 60%, and most preferably less than 20% based on the total monomer weight, of one or more monomers copolymerizable with the vinyl aromatic monomer such as another vinyl aromatic monomer, substituted and unsubstituted acrylates, methacrylates, acrylic acids, methacrylic acids and anhydrides, for example, maleic anhydride. By "segmented" we mean that the copolymer can be a graft copolymer or a block copolymer or a combination of a graft copolymer and a block copolymer. In one method of manufacturing, when a segmented copolymer is prepared from a polyolefin in solution (for example in tert-butyl benzene), the vinyl monomers are added to the polyolefin together with an initiator which generates a constant low radical concentration, or radical "flux", at the solution temperature. These radicals initiate polymerization of the monomer and cause formation of a covalent bond with the trunk.

A unique aspect of the present invention lies in the discovery that the segmented copolymers of polyolefins and polymers formed from vinyl aromatic monomers impart improved melt strength to polyolefins only when prepared under certain specified conditions, which appear to be related to the half-life of the free-radical initiator employed in their preparation. More specifically, a free-radical initiator should be employed which has a half-life of one hour within the temperature range of about 110 to about 125 degrees C. Employment of initiators with half-lives of one hour realized at temperatures outside this range produces segmented copolymers in high efficiency, but those segmented copolymers are much less effective in improving the sag resistance when combined with polyolefins. Although tested most thoroughly with the non-solvent process described herein, the process restriction is applicable to solution and aqueous heterogenous processes also. Unlike the grafting process described for methacrylic monomers in U.S. Pat. No. 4,957,974, wherein the radical flux during polymerization was important to achieving an additive which improved the melt strength of polyolefins, for processes involving vinyl aromatic monomers, the radical flux per se does not seem to be critical.

The resulting segmented copolymer (which may include ungrafted homopolymers) may be blended with polyolefin either as a result of the manner by which it is made, or after it is made. The resulting blend may be extruded into a desired shape either directly, or after pelletization. The resulting blended product exhibits high sag resistance without an increase in melt viscosity, as compared with similar ungrafted polymers, viz.: polyolefins without a high molecular weight chain or chains covalently bonded thereto.

The segmented copolymer may also be blended with polymers other than polyolefins, and particularly with mixtures of two or more polymers which are poorly compatible with one another, and which may or may not include polyolefins, to improve the compatibility of the resulting mixture.

One process for making the blends of this invention involves admixing the polyolefin, the vinyl aromatic monomer and an initiator, and heating to above 100° C. but below the softening point of the polyolefin (to about 140° C. in the case of polypropylene) to decompose the initiator to begin the grafting reaction. The radicals initiate polymerization of the monomer and formation of a covalent bond therewith on the polyolefin trunk. The resultant product consists of the polyolefin with the chain grafted thereto, unreacted polymer, and ungrafted polyvinyl monomer (the amount of which is small, as the grafting efficiency is high). The product may be directly blended with the polyolefin (since the process directly yields pellets). In this preferred method, it is believed a graft copolymer is formed by abstraction of a hydrogen atom from the polyolefin and polymerization of the monomer at that site. However, the possibility of some chain scission of the polyolefin to create polymerization sites at chain ends, and thus to form block copolymers, cannot be overlooked.

The product from the solution process may be pelletized, blended with another polyolefin and extruded into desired shape. Alternatively the reaction mixture may be extruded directly in a devolatilizing extruder to volatilize residual monomer, and thereafter blended with a polyolefin and the blend extruded to form article in such forms as sheets, tubes and the like.

DETAILED DESCRIPTION

In general this invention relates to a polymer blend comprising or consisting essentially of:
a) a polyolefin and
b) from about 0.1 to about 50% and preferably from 0.2 to less than about 10% of a segmented copolymer of a non-polar polyolefin (for example a polymer or copolymer of polyethylene, polypropylene, polybutylene, or poly(4-methylpentene)), covalently bonded to a polymer derived from greater than 20 to about 100% (preferably, from about 40 to about 100% and more preferably, from about 80 to about 100%) of a vinyl aromatic monomer such as styrene, methylstyrene, dimethylstyrene, ethylstyrene, isopropylstyrene, chlorostyrene, dichlorostyrene, trichlorostyrene, α-methylstyrene, bromostyrene, tribromostyrene, and the like and from about 0 to 80% (preferably from about 0 to about 60%, and more preferably from about 0 to about 20%) based on the total monomer weight, of one or more monomers copolymerizable with the vinyl aromatic monomer such as other vinyl aromatic monomers as defined above, substituted and unsubstituted acrylates and methacrylates, such as methyl methacrylate or lauryl methacrylate, N-vinyl pyrrolidone, acrylic acids, methacrylic acids and anhydrides such as maleic anhydride and the like. The copolymerizable monomer may also be a crosslinker containing at least two vinyl groups such as divinyl benzene, glycol dimethacrylate and the like.

The invention further relates to articles prepared from the above polymer blends, which articles may be in extruded, calendered, thermoformed or molded form, or which may be in the form of a fiber, sheet, or hollow container.

In the following, "LDPE" is low-density polyethylene, usually branched, of density of about 0.91 to about 0.94 g/cc; "HDPE" is high-density polyethylene of a density above about 0.95 g/cc; "LLDPE" is linear low-density polyethylene of density about 0.91 to about 0.95 g/cc; "EPDM" includes rubber terpolymers of ethylene, propylene, and a non-conjugated diene monomer, such as 1,4-hexadiene or ethylidenenorbornene.

The term "polar" or "non-polar" polymer, as used herein, is all relative to polyolefins. Generally "non-polar" means polymers which are predominantly formed from monomer units of mono- or di-olefins. "Polar", as generally understood in the polymer art, refers to monomers or polymers which contain an oxygen, nitrogen, or sulfur functionality. However, when compared to polyolefins other materials are also "polar" such as polystyrene. Methyl methacrylate, acrylonitrile, and vinyl phenyl sulfone are "polar" monomers, whereas polypropylene is a "non-polar" polymer.

The segmented copolymers to be added to the polyolefins to form the blends of this invention may be block or graft copolymers or a mixture of graft and block copolymers. The polymers to be modified in the grafting process include the non-polar olefin polymers and copolymers. Included are polypropylene, polyethylene (HDPE, LDPE, and LLDPE), polybutylene, ethylene-propylene copolymers at all ratios of ethylene and propylene, EPDM terpolymers at all ratios of ethylene and propylene and with diene monomer contents up to 10%, poly(1-butene), polymethylpentene, ethylene-vinyl acetate copolymers with vinyl acetate contents up to 25%, ethylene-methyl acrylate copolymers, ethylene-methyl methacrylate copolymers, and ethylene-ethyl acrylate copolymers. Also included are mixtures of these polymers in all ratios. Preferred is polypropylene or polyethylene.

A polyolefin trunk having a molecular weight of from about 200,000 to about 800,000 $M_w$ (weight-average molecular weight) is especially preferred, but polyolefins having a molecular weight of about 50,000 to about 200,000 can be used with some beneficial effect. In general, a graft copolymer imparts greater melt-rheology improvement to a high-molecular-weight polyolefin.

Melt flow rate (mfr) is known to correlate with weight-average molecular weight. The preferred range of mfr values for the polyolefin trunks used in preparing the graft copolymers of the present invention are from about 20 to about 0.6 g/10 minutes as measured by ASTM Standard Method D-1238 (condition 230/2.16).

The vinyl aromatic monomers that can be employed to prepare the vinyl polymers are preferably styrene type monomers such as styrene, methylstyrene, dimethyl styrene, ethylstyrene, α-methylstyrene, bromostyrene, chlorostyrene, and the like. Styrene is the most preferred.

Also, the preferred invention further relates to articles prepared from the polymer blends wherein the vinyl aromatic monomer is styrene, the polyolefin is polyethylene or polypropylene, preferably polypropylene, and the non-polar polyolefin component of the segmented copolymer is formed by the polymerization of ethylene or propylene, i.e., is polyethylene or polypropylene, preferably polypropylene. These articles may be in extruded, calendered, thermoformed or molded form, such as in the form of a fiber, sheet, or hollow container.

The initiators employed in the preferred swell process should preferably have a one hour half life at a temperature in the range of from about 110° C. to about 125° C. Such initiators include tert-butyl peroxybenzoate (125° C.), di-tert-butyl diperoxy phthalate (123° C.), tert-butyl peroxycrotonate (118° C.); 2,2 bis-tert-butyl(peroxybutane) (119° C.); tert-butylperoxy isopropyl carbonate (119° C.); 2,5 dimethyl-2,5-bis(benzoylperoxy)-hexane (118° C.); tert-butyl peracetate (120° C.); di-tert-butyldiperoxyphthalate (123° C.). The figures in parentheses are the 1 hr. half-life temperatures.

Other initiators may also be employed or example, 2,4-pentanedione peroxide (167° C.), di-tert-butyl peroxide (149° C.), 2,5-dimethyl-2,5-di(tert-butylperoxy)-hexyne (149° C.), and the like, to prepare segmented copolymers not useful as sag-resistance improvers. Such segmented copolymers can be utilized as compatibilizers for polyolefins blended with more polar resins.

The compounding portion of the thermoplastic polymer particles, vinyl aromatic monomer and polymerization initiator in the system prior to polymerization is (a) 50–99.9 weight parts, preferably 50–90 weight parts, of the thermoplastic polymer particles,
(b) 50–0.1 weight parts, preferably 50–10 weight parts, of the vinyl monomer and
(c) 0.05–20 weight parts, preferably 0.1–10 weight parts, of the polymerization initiator per 100 weight parts of the vinyl monomer.

A thermoplastic polymer particle content of less than the stated range (a vinyl monomer content greater than the range) results in agglomeration of the polymer particles during the reaction although multi-step addition of the monomers may be employed to avoid such agglomeration. A content of more than the stated range (a vinyl monomer content of less than the stated range) results in an inadequately modified product. A polymerization initiator content of less than the range cannot fully polymerize the vinyl monomer, whereas a greater content leads to reactions other than polymerization such as deterioration of the polymer or gelation.

A typical method for combining the thermoplastic polymer particles with a vinyl monomer involves mixing the thermoplastic polymer particles with the vinyl monomer containing the polymerization initiator (and other additives as required). Another method is by mixing the thermoplastic polymer particles with the polymerization initiator and then adding the vinyl monomer. Another method is by adding monomer and initiator throughout the reaction. Another method is by adding monomer, heating, and then adding initiator. Since combination of monomer, polymer, and initiator should be efficiently done by heating under conditions where the polymerization initiator is not decomposed, the temperature should ordinarily be less than 100° C., preferably about room temperature to 90° C. It is preferred for ease in handling the resultant product that, when polypropylene is used as the polymer particle, it be in a form with high surface; however, polyolefin pellets without enhanced surface area may be employed.

The combination time for admixture and heat-up is ordinarily on the order of from ½ to 8 hr. In mixing the thermoplastic polymer particles with a vinyl monomer (and polymerization initiator), auxiliary materials such as plasticizer, lubricant, crosslinker and the like may be simultaneously combined (these auxiliary materials may already have been added to the thermoplastic polymer particles or can be compounded after polymerization).

It has been found that with styrene, no additional impregnation time need be involved beyond that of heating the monomer and polymer to the desired temperature. Sufficient combination of monomer and polyolefin occurs during the mixing and heat-up cycle.

In order to control the molecular weight of the polymer produced by the polymerization of the vinyl monomer, a chain transfer agent such as n-butyl mercaptan, n-dodecyl mercaptan or tert-dodecyl mercaptan may be added.

By increasing the temperature of the impregnated thermoplastic polymer particles or of the well-mixed monomer/polyolefin combination obtained in the above-stated manner to a level at which the polymerization initiator is decomposed at a suitable rate, the impregnated or well-mixed vinyl monomer is polymerized to form the modified thermoplastic polymer particles.

Because radical polymerization is involved, heating should be done in an essentially oxygen-free atmosphere and suitable mixing provided during polymerization. Since it is essential to polymerize under conditions where the thermoplastic polymer particles are not dissolved or fused, the polymerizing temperature should be in the range of from about 60° to about 150° C. Exceeding 50° C. not only favors gelation but also melt fusion or aggregation of the particles.

The polymerizing time is ordinarily on the order of from 0.5 to about 10 hr and the polymerizing pressure ordinarily on the order of ordinary pressure to 10 kg/sq cm. The mixing, impregnating, and polymerizing processes are implemented preferably in the absence of water. One means employs of a single apparatus provided with means for heating and mixing without recourse to stirring vanes. In order to impregnate uniformly and distribute the heat evenly, it is desirable that the components of the system be continuously mixed throughout the impregnation and polymerization processes. Mixing by means of stirring vanes is undesirable because the thermoplastic polymer particles are often marred or fractured while the stirring may be inadequate. Mixing should be done by means of a self-moving apparatus without depending on vanes such as the self-rotating type, vibration type or self-rotating and vibration type unit. A unit may also be provided with a baffle plate for increasing the degree of mixing among others, a system in which the unit freely rotates on its own axis is desirable, especially a rotating axis that is set at an angle of less than 80 degrees with respect to the horizontal axis. Any unit having a horizontal axis of rotation which is commonly used is satisfactory. Heating methods involve the circulation of a suitable medium such as steam, hot water or oil or a means for providing electrical heat from within or without the unit may be used. After polymerization, even when simple drying or deodorization is required, post-processings such as ventilation and decompression can be done within the unit without recourse to other means.

Upon further study of the process, it has been found that reactors equipped with stirrers and with baffle or mixing vanes may be employed without as severe degradation of the resulting segmented copolymer's physical shape as had been first anticipated.

The process may be one shot, or when conducted in solution, run in a semicontinuous or continuous manner. Vinyl monomer and initiator may be added by means similar to those described above. Additives may also be added when the graft copolymer is blended with the matrix polymer. Such additives may include stabilizers against light or heat, such as benzotriazoles, hindered amines, alkyl polysulfides such as dialkyl disulfides, and the like, lubricants, or plasticizers; flame retardants; and the like.

The product is isolated by stranding, cooling, chopping, drying, and bagging, or other known collection techniques. In the preferred one-shot process conducted without solvent, the product is already in pelletized form and need merely be collected.

The polyolefin and the graft copolymer may be blended by mixing the dry feed materials and extruding either directly to form a film, sheet or the like, or by collecting the blend and reprocessing it into the desired article, or by adding the polyolefin in the course of the devolatilization.

Polyolefins are often produced with one or more stabilizers to prevent degradation of the polymer appearance or physical properties during processing and/or end use. Such stabilizers may include metal salts such as metal stearates, which act as acid acceptors, hindered phenols, or phosphites which act as antioxidants, and sulfur-containing organic esters or derivatives, added as heat stabilizers. Examples of such additives, which are usually proprietary to the supplier, are metal stearates, 2,6-dimethylphenolic compounds, Irgafos 168 and thiodiesters of long-chain alcohols. Polyolefins may also contain light stabilizers, such as hindered amines, hydroxy benzotriazoles, and the like. All of the polyolefins used in the present examples are thought to contain small amounts of these proprietary stabilizers.

One way to specify the blend composition is that at least about 0.2% of the total formulation (polyolefin plus segmented copolymer) should be a chemically segmented polymer or copolymer within the molecular weight limits specified. The preferred maximum amount is about 10% grafted polymer, with up to about 5% segmented polymer being especially preferred for cost optimization and optimization of most properties of the blend.

Optionally, the blend of concentrate i.e., the segmented copolymer plus any ungrafted non-polar polyolefin or polymer of the vinyl aromatic monomer, and polyolefin, may be further modified by the introduction of fillers (both inorganic and organic), fibers, impact modifiers, colorants, stabilizers, flame retardants, and/or blowing agents.

Blowing agents may be gases, such as nitrogen or carbon dioxide, admixed with the polymer melt in the extruder and allowed to expand upon extrusion. More often, blowing agents are solids which liberate gases, usually nitrogen, at a specific melt temperature, and which are mixed into the melt, or blended from a precompounded mixture of the blowing agent dispersed in a polymeric matrix. The melt temperatures for the polyolefins are typically in the range of about 200° to about 230° C., although other temperatures may be used, depending on the specific blowing agent. Solid blowing agents include azo compounds such as azodicarbonamides, azoisobutyronitriles, hydroazo compounds, or compounds containing the nitroso group.

The processing of the polyolefin//segmented copolymer blend for improved sag resistance is performed in the melt. The sag resistance test described herein is an appropriate measure of achievement of the desired resistance, and is quantified by stating that acceptable and novel improvement of melt strength requires a sag slope value for the blend (which contains 5 weight percent of segmented polymer, based on total content of polyolefin and segmented copolymer) below 20% of the value for the unmodified polypropylene under similar test conditions. This value converts to a melt strength ratio, defined as $$\frac{\text{sag resistance of matrix polymer}}{\text{sag resistance of blend containing 5\% of segmented copolymer}}$$

of at least 5.

The blend of the segmented copolymer and polyolefin is useful in thermoforming, especially of large objects which sag prior to thermoforming, such as containers, cups, panels and the like. Thermoforming of polypropylene, including a list of commercial uses and a description of test methods, such as sag testing, is described in J. L. Thorne, "*Thermoforming*", Munich/Vienna/New York (1987). The blend is also useful in film making (especially blowing and extruding), blow molding, such as for forming drums, coolers industrial parts, automotive parts, and the like, fiber spinning, acid and basic dyeing, foaming, extrusion (sheet, pipe, and profile), coextrusion (multilayer film, sheet, preforms, and parisons, with or without the use of tie layers), hot melt adhesives, calendering, and extrusion coating (for the preparation of polymer/fabric, carpet, foil, and other multilayer constructions). Such graft copolymers, especially with small amounts of copolymerized acid functionality, are useful when blended with polyolefins for improved printability. The grafts themselves may be used as tie layers between otherwise incompatible polymers.

In extrusion, the copolymer is useful, especially with LLDPE, at reduction of melt fracture without an effect on the melt flow rate.

When polypropylene is modified with the copolymers of the present invention, it may be employed in the manufacture of many useful objects, such as extrusion- or injection-blown bottles for packaging of foodstuffs, aqueous solutions such as intravenous feeds, hot-filled items such as ketchup, or extruded articles in profile form such as clips, scrapers, window and door casings and the like. The foamed articles may be used as substitutes for wood in moldings, for packaging materials, for insulation or sound-deadening materials, for food containers, and other rigid-article applications. Films may be used in many protective or wrapping applications, such as for food packaging, blister packaging of consumer goods, and the like.

The copolymers of the present invention are useful in preparing polyolefin fibers, especially polypropylene fibers; they are especially useful when the graft copolymer is formed from a polypropylene trunk. Polypropylene is relatively easy to process into fibers having high strength and toughness.

Polypropylene fibers show certain deficiencies which include difficulty in dyeing and poor long-term dimensional stability. Grafts containing functional sites capable of accepting dye may be prepared by the present process by incorporating low levels of dye-accepting monomers, such as methacrylic acid, dimethylaminoethyl methacrylate, N-vinylpyridine, and the like. The improved sag resistance noted for the present segmented polymers in a polypropylene matrix should correspond to improvements in creep resistance of the fiber.

Polypropylene may be formed into fibers by slitting tape from extruded film to form large-denier, coarse fibers, by extruding monofilaments into large-denier fibers with a controlled cross-sectional size, or by extruding multifilaments through a spinnerette to produce bundles of small-denier fibers. In all cases, the fibers may be draw-textured.

Polypropylene fibers may be used for, among other things, strapping, netting (including fish nets), slit tape, rope, twine, bags, carpet backing, foamed ribbon, upholstery, rugs, pond liners, awnings, swimming-pool covers, tarpaulins, lawn-furniture webbing, shades, bristles, sutures, cigarette filters, nonwoven fabrics, such as for tea bags, bed sheets, bandages, diaper liners and the like,land for doll hair, apparel and the like.

The copolymer of the present invention may also be used to improve the compatibility of polymers in blends where they would otherwise be poorly compatible. The segmented copolymer is incorporated into such blends, preferably at levels of from about 0.2 to about 10%, preferably from about 0.5 to about 5%, and more preferably from about 0.8 to about 2.5%, to achieve the desired improvement in compatibility. Higher levels of the segmented copolymer may be used, but increases above the preferred level generally show only small improvements in compatibility. For such blends, it is believed the segmented copolymers used as compatibilizers need not be only those which exhibit good sag resistance in polypropylene.

As noted above, compatibility is not easily predicted. As a general rule non-polar polymers are poorly compatible with more polar polymers, but poorly compatible blends may also be found experimentally among polar-polar or non-polar-non-polar blends. Examples of the non-polar polymers are olefinic polymers such as high- and low-density polyethylene and linear low-density polyethylene, polypropylene including atactic polypropylene, poly-1-butene, poly-iso-butylene, ethylene-propylene rubber, ethylene-acrylic acid copolymer, ethylene-propylenediene terpolymer rubber, ethylene-vinyl acetate copolymer, poly (ethylene-propylene), polymethylpentenes, and ionomers such as polymers of ethylene with metal-salt-neutralized acrylic acid.

Relatively more polar polymers, called "polar polymers" for the purposes of this disclosure, include acrylonitrile-butadiene-styrene polymer, acetal polymers, polyarylates, acrylic-styrene copolymers, acrylonitrile-styrene-acrylic polymers, acrylonitrile-styrene polymers modified with ethylene-propylene rubber, cellulosics, polyester-polyether block copolymers, polyesters such as polybutylene terephthalate and polyethylene terephthalate, and including liquid-crystal polyesters, polyetheramides, polyetheretherketones, polyetherimides, polyethersulfones, ethylene-vinyl alcohol copolymers, polyvinyl chloride, chlorinated polyvinyl chloride, polyvinylidene chloride and fluoride, styrene polymers such as polystyrene, high-impact polystyrene, styrene-acrylonitrile copolymers, styrene-butadiene copolymers, styrene-maleic anhydride copolymers, alkyl-substituted styrenes copolymerized with styrene alone or with the additional monomers listed for styrene, polyphenylene ether, polyphenylene sulfide, polysulfone, polyurethane, polyamides, i.e., nylons such as nylon 6, nylon 6.6, nylon 6.9, nylon 6.10, nylon 6.12, nylon 11, nylon 12, amorphous nylons, polyamideimide, polycaprolactone, polyglutarimide, poly(methyl methacrylate); other $C_1$ to $C_8$ poly(alkyl (meth)acrylates) and polycarbonates. The acrylic polymers referred to above are polymers containing at least 50 weight percent, and preferably at least 80 weight percent, of mers of acrylic acid and/or methacrylic acid (referred to collectively as (meth)acrylic acid) or their esters, preferably their alkyl esters and more preferably their alkyl esters in which the alkyl group contains from one to eight, preferably one to four, carbon atoms. The remaining mers are those from one or more monomers copolymerizable with the (meth)acrylic acid or ester by free-radical polymerization, preferably vinylaromatic monomers, vinyl esters or vinyl nitriles, and more preferably mers of styrene or acrylonitrile.

In the examples which follow, polymer concentrates (i.e., the segmented copolymer plus any ungrafted components) and polymer blends are tested using standard procedures which are summarized below.

The polypropylene, polymer concentrate, and any additives are blended in the melt on a 7.6 cm by 17.8 cm electric mill with a minimum gap of 3.8 mm set at 190° C. Once the material had fluxed, it is mixed an additional 3 minutes. Higher temperatures are used for higher viscosity materials (for example, mfr=0.5−2 material is done at 195°–210° C.). While still hot, the material is either compression molded or cut into small chunks (about 1–2 cm in each dimension) for granulation (5 mm screen). It is of interest that the additives of the present invention contribute to easy release from hot metal surfaces, such as mill rolls, Haake Rheocord bowls, etc.

The polyolefin blends are compression molded in an electrically heated Carver press 15×15 cm or Farrel press 30.5×30.5 cm. The samples are molded between stainless steel with an appropriate spacer to provide the required thickness 0.25–3.8 mm. In one method the hot melt is taken directly from the mill roll and placed between two stainless steel sheets. This is then placed in the press set at 190° C. and pressed at high pressure (68–91 metric tonnes for the Farrel press and 6820 kg for the Carver press). After three minutes the mold is placed in an unheated press at high pressure for three minutes. In the other procedure, granulated material or pellets produced from an extrusion, Haake, or milling operation are dried and then compression molded. The procedure used is the same as for molding a melt except that a 5 minute preheat is used while maintaining a slight pressure on the press. This is followed by the high pressure molding in the hot and cold presses. A hot press of 190° C. is usually sufficient for mfr=4 polypropylenes, but higher viscosity (lower mfr) polypropylenes would split during sag testing unless higher molding temperatures are used (195°–210° C.).

The sag tests are performed on a compression molded sheet 10×10×0.15 cm. This sheet is clamped in a frame with a 7.6-cm-square opening. There are metal rulers attached to the front and back of the frame for use in measuring sag. The frame and sheet are placed in a hot, forced air oven (typically at 190° C.). The amount of sag of the center of the sheet is then recorded as a function of time. Typically, the sag is first recorded at 2.5 cm but for slow sagging materials sags as low as 16 mm are recorded. Data is recorded up to 10.2 cm of sag or for 30 minutes, whichever occurred first.

The term "slope" refers to the slope of a plot of the natural logarithm of the sag in centimeters versus time, resulting in a straight line. A high slope indicates that the material sags quickly while a low slope indicates that it sags slowly. The advantage of comparing slopes in this manner is that it eliminates any differences in oven cooling when the sample is introduced.

The recoverable compliance test is carried out on a Rheometrics Stress Rheometer. The sample is placed between the parallel plates (1 mm gap) of the rheometer at 190° C. and subjected to a shear stress of 1000 dynes/sq.cm. The stress is applied for 1000 seconds during which time the compliance versus time is recorded. The shear stress is then removed and the sample allowed to recover. The compliance versus time is recorded again and the final compliance at 1000 seconds is determined. The recoverable compliance is the difference between the final compliance of the stress cycle and the final compliance from the recovery cycle. The sample is a small disk (25 mm diameter) cut from a 60 mil (2.12 mm.) plaque, which is prepared by melt blending the sample into the polyolefin on an electric mill at 190° C., then compression molding the plaque in an electrically heated Carver press at 190° C. for three minutes and at 70 metric tonnes with a 60 mil spacer followed by cold pressing for three minutes.

The examples are intended to illustrate the present invention and not to limit it except as it is limited by the claims. All percentages are by weight unless otherwise specified and all reagents are of good commercial quality unless otherwise specified.

EXAMPLES

The following procedure and apparatus is used to prepare the segmented copolymers.

APPARATUS and GENERAL PROCEDURE

A 2 part 1 liter resin kettle with a 4 neck top is equipped with a Teflon paddle stirrer, a thermocouple with a temperature control unit, a heating mantle and a Allihn condenser. (All joints should be ground glass.) The interface between the top and the bottom of the reactor must have a Teflon gasket. The stirrer adaptor apparatus must maintain a vacuum when it is applied to the reaction vessel.

The reactor should be able to maintain the vacuum at the same level at which is supplied, 30 inches of Hg. for at least 15 mm.

Charge polypropylene into the reactor. Degas the reactor and replace with nitrogen 5 times. After the last degassing, allow nitrogen to slowly free flow through the reactor. Mix the styrene—initiator solution and degas with nitrogen for 20 minutes. Pump the solution into the reactor. Commence the swell phase at the recommended temperature. (Preferably, heat the reaction mixture at greater than 1° C./minute directly to 115° C.) When the swell is completed, set temperature controller to 115° C. Reaction will begin. The resulting exothermic event will cause the temperature to reach approximately 140° C. As the temperature drops maintain the temperature at 140° C. Collect the product and dry overnight at 80° C. in a vacuum over.

Example 1—Blend of 98% Polypropylene and 2% Segmented Copolymer

Step A—Segmented Copolymer

Polypropylene (125 g) beads are added to a 1L kettle type reactor and the system evacuated and refilled with nitrogen. The styrene monomer (30 ml) containing tert-butylperoxy benzoate initiator (200 mg) is degassed by bubbling nitrogen through for 20 m. The monomer—initiator solution is then rapidly pumped into the polypropylene (5 m). While the polypropylene and styrene is stirred the temperature is raised to 90° C. (swell temperature). The temperature is maintained for 1 h (swell time). The temperature is then raised to 140° C. for 2 h. The heating is then removed and the still free flowing pellets are dried overnight at 60° C. in a vacuum oven to yield 146 g of segmented copolymer mixture.

Step B—Blend of 98% Polypropylene and 2% of Segmented Copolymer of Step A

The sag slope of this material is determined as described above and shown to be 0.039 when blended into polypropylene at 2%. The mfr of the blend is 4.18 (condition L of ASTM D-1238.)

(The MFR of the polypropylene is 3 to 5—Condition L.)

The segmented copolymer is extracted continuously with ethyl acetate for 16 h in order to remove the polystyrene homopolymer.

Example 2—Blend

Step A—Segmented Copolymer

The experiment described in example 1 is repeated in order to determine the reproducibility of the swell process. A yield of 145 g of product is obtained.

Step B—Blend of 98% Polypropylene and 2% Copolymer of Step A

A sag slope of 0.046 is measured (2% blended into polypropylene).

Example 3—Blend

Step A—Segmented Copolymer

The experiment in example 1 is repeated but with the following changes. The quantity of polypropylene is increased to 175 g and the initiator level (tert-butyl peroxy benzoate) increased to 500 mg. The temperature is raised to 85° C. at a rate of greater than 2°/minute. A yield of 200 g is obtained. The swell temperature is 85° C. and the swell time is 0.5 h.

Step B—Blend

The blend had a measured sag slope of 0,021 when blended into polypropylene at 1%.

Example 4—Blend

Step A—Segmented Copolymer

The experiment described in example 1 is repeated but with the following changes. The polypropylene quantity is decreased to 85 g and the initiator amount (tert-butyl peroxy benzoate) decreased to 100 mg. The swell temperature is increased to 95° C. and the swell time increased to 2 h. Yield 101 g.

Step B—Blend of 98% PP and 2%

A blend of 98% polypropylene and 2% of the graft copolymer of Step A had a measured sag slope of 0.105 when blended into polypropylene at 2%.

Example 5—Blend

Step A—Segmented copolymer

Polypropylene (100 g), of MFR 4, is placed in a 1L reaction kettle and tert-butylbenzene (400 ml) is added. The reaction vessel and contents are degassed and heated to 160° C. under a nitrogen atmosphere in order to dissolve the polypropylene and subsequently this solution is cooled to 140° C.

The monomer and initiator solution (150 ml of styrene and 357 mg of tert-butyl peroxybenzoate) is deoxygenated by bubbling nitrogen through for 30 min. The monomer and initiator is then pumped into the polypropylene solution at a rate of 2.5 ml per minute while maintaining the temperature at 140° C.

The temperature is held at 140° C. for a further hour and then the reaction allowed to cool to room temperature.

The solvent is removed by heating at 60° C. in a vacuum oven overnight to yield 146 g of segmented copolymer.

Step B—Blend

The segmented copolymer of Step A is milled at 4% into polypropylene (MFR 4) and a plaque prepared. A sag slope of 0.021 is obtained for this plaque.

In one modification of this solution process the monomer styrene above is replaced with a mixture of styrene (142.5 ml) and methacrylic acid (7.5 ml). The plaque prepared from this product (2% into polypropylene of MFR 4) exhibited a sag slope of 0.136. It is believed that this value would extrapolate to a melt strength ratio of less than 5; the reason for poorer, although significant, sag resistance for this variant is not known.

Example 6—Blend 96% PP—4% Copolymer

As in Example 1 but replacing the styrene (30 ml) with styrene (27 ml) and methyl methacrylate (3 ml). This blend has a sag slope of 0.02 when milled into polypropylene at 4%.

Example 7—Blend—96% PP—4% Copolymer

As in Example 1 but increasing the polypropylene quantity to 150 g and replacing the styrene (30 ml) with styrene (32.4 ml) and maleic anhydride (3.3 g) and increasing the initiator quantity (to 240 mg). This blend has a sag slope of 0.0315 when milled into polypropylene at 4%. The blend is exhaustively extracted with ethyl acetate and an infra-red spectrum contained peaks at 18157 $cm^{-1}$ indicative of the presence of the anhydride in the product and at 700 $cm^{-1}$ indicative of polymerized styrene.

A blend of this segmented copolymer with a higher Mw polypropylene in a 17.15/82.15 ratio produced a blend with 58% higher Dynatup impact then the unmodified polypropylene.

Example 8—96% Polyethylene 4% Copolymer

As in Example I but replacing the polypropylene (125 g) with polyethylene (150 g) and increasing the styrene (30 ml) to styrene (36 ml) and the initiator (to 240 mg). The blend had a sag slope of 0.036 when blended into polypropylene at 4%.

This segmented copolymer, when added (1515 parts) to a blend of polyethylene and polycarbonate, increases elongation at break by 50%, but tensile modulus is slightly decreased.

Example 9—Blend 96% PP—4% Copolymer

As in Example I but replacing the styrene (30 ml) with styrene (27 ml) and butyl acrylate (3 ml), increasing the polypropylene quantity (to 150 g) and the initiator quantity (to 240 mg). The product had a sag slope of 0.026 when blended into polypropylene at 4% and the exhaustively extracted (with ethyl acetate) blend had peaks at 1730 (polymerized butyl acrylate) $cm^{-1}$ and 700 $cm^{-1}$ (polystyrene) in its infra-red spectrum.

Example 10—Blend—96% PP—4% Copolymer

As in Example 1 but replacing the styrene (30 ml) with a mixture of lauryl methacrylate (29 ml) and methyl methacrylate (7 ml), increasing the polypropylene quantity (to 150 g) and the initiator quantity (to 240 mg). The product had a sag slope of 0.086 when milled into polypropylene at 4% and the exhaustively extracted material (with ethyl acetate) had peaks in its infra red spectrum at 1733 $cm^{-1}$ and at 700 $cm^{-1}$.

Example 11—Blend of 96% PP—4% Copolymer

As in Example 1 but replacing the styrene (30 ml) with styrene (21.6 ml), methyl methacrylate (7.2 ml) and N-vinyl-2-pyrrolidone (7.2 ml) and increasing the polypropylene quantity (to 150 g) and the initiator quantity (to 240 mg). The blend had a sag slope of 0.031 when blended into polypropylene (at 4%) and the infra red spectrum of the exhaustively extracted blend (with ethyl acetate) has peaks at 1728 (polymethyl methacrylate) $cm^{-1}$, 1685 $cm^{-1}$ (polymerized N-vinyl-2-pyrrolidone) and 700 $cm^{-1}$ (polystyrene).

Example 12—Blend—96% PP—4% Copolymer

As in Example 1 but replacing the styrene (30 ml) with a mixture of styrene (22 ml) methyl methacrylate (7.0 ml) and glycidyl methacrylate (7.0 ml) and increasing the polypropylene quantity (to 105 g) and the initiator quantity (to 240 mg). The blend had a sag slope of 0.036 when blended into polypropylene at 4%. The exhaustively extracted blend (with ethyl acetate) exhibited peaks in the infra-red at 1729 $cm^{-1}$ (polymerized methacrylates) and 700 $cm^{-1}$ (polystyrene).

Example 13—Blend—96% PP—4% Copolymer

As in Example 1 but replacing the styrene (30 ml) with a mixture of styrene (21.6 ml) methyl methacrylate (10.8 ml) and maleic anhydride (3.3 g) and increasing the polypropylene and initiator amounts (to 150 g and to 240 mg respectively). A blend of 96% polypropylene and 4% of the copolymer (styrene, methyl methacrylate and maleic anhydride) has a sag slope of 0.042. The exhaustively extracted blend (ethyl acetate) exhibited peaks in the infra red at 1720 $cm^{-1}$ (methyl methacrylate) at 1780 $cm^{-1}$ and 1856 $cm^{-1}$ (polymerized maleic anhydride) and at 700 $cm^{-1}$ (polymerized styrene).

Example 14

A 1L pressure reactor is charged with polypropylene mfr=4, (believed prepared by the process of European Patent Application 437,808) (50 g), styrene (50 g), initiator (tert-butyl peroxy benzoate, 200 mg) and deionized water (343 g). The system is heated to 140° C. under a nitrogen atmosphere and at a pressure of 44 psi. It is held at this temperature for 1 h. Only a small amount of agglomeration of the polymer is observed in the reactor. The reaction is cooled and the copolymer collected by filtration and then dried in a vacuum oven to yield 97.7 g of material. A blend of this material with 4% polypropylene had a sag slope measured at 0.03.

Example 15

A blend is prepared of 5 weight percent of the segmented copolymer of Example 3 in Himont 6523, homopolymer of propylene, mfr 3.5-4.5 grams/10 minutes, ASTM 1238. The flow rate of the neat segmented copolymer is 0.02 grams/10 minutes at the same test temperature. The crystallization temperature of the neat segment copolymer is 116.6° C.

Other properties are compared below.

| Test | Control PP | 5% Blend |
|---|---|---|
| Tensile Modulus (ASTM D638) | 216,900 psi (1494 mPa) | 244,100 psi (1681 mPa) |

-continued

| Test | Control PP | 5% Blend |
|---|---|---|
| Notched Izod Impact (ASTM D256) | 0.47 ft.lb/in (25 J/m) | 0.64 ft.lb/in (34 J/m) |
| Load at Break (ASTM D638) | 45.3 lbs. (20.6 kg) | 52.0 lbs (23.6 kg) |
| Stress at Break (ASTM D638) | 3340 psi (2.3 mPa) | 3607 psi (2.49 mPa) |
| DSC Crystallization Temp. | 109.6° C. | 122.6 (2% blend) |

This increased modulus, impact, load at break and stress at break are attractive properties for a blend useful in commercial thermoforming and packaging application, as is the enhanced nucleation seen.

Example 16

The conditions of Example 3 are repeated, except that there is no hold time at 85° C. The sag slope of this segmented copolymer at the 2% level in the referenced polypropylene is negligible (below 0.02).

Example 17

A blend is made of 5 weight percent of the segmented copolymer of Example 16 with Aristech Ti 4007F, believed to be a copolymer of propylene with 7.4% ethylene, mfr 0.7. The polymer is chosen because it has good impact strength at room and refrigerator temperatures and contains additives which qualify it for food packaging uses. Properties are shown below: the higher extrusion rate (for a 0.10 inch (2.5 mm.) sheet appears to be a consequence of the improved melt strength which permits faster extrusion without breaking. The wider thermoforming window allows commercial production of parts without "webbing" (holes or tears formed by exceeding the thermoformability of the polymer at a set temperature) over a wider temperature range. To determine the thermoforming window, the values are normalized to the behavior of an unmodified polyolefin sheet, and what is determined in a standardized thermoforming operation is the relative temperature range over which an acceptable part can be formed. A sheet of polypropylene, modified or unmodified, is produced by a 2.5 inch (63.5 mm) extruder, and cut to a 0.100"×21.5"×27" sheet (2.54 mm.×0.546 m×0.686 m). The sheets are then formed in a 4-cavity mold in a Brown thermoformer. The mold has depressions of various sizes, which allows the modified polyolefin to be tested for thermoformability under a variety of stretch and orientation conditions, simulating practical thermoforming of commercial articles. The thermoforming window is the temperature range over which a good part can be formed. A good part is one that does not contain any warpage or "folding over" in the part. These windows are reported as "normalized values" relative to the window of the unmodified material.

| Test | Control PP | 5% Blend |
|---|---|---|
| Vicat Softening Temp. (ASTM D-1525) | 142.9° C. | 145.4° C. |
| DTUFL (ASTM D-648) | 48.7° C., 264 psi (1.81 mPa) | 52.7° C., 264 psi (1.81 mPa) |
| Melt Flow rate (ASTM 1238) | 0.74 g/10 min. | 0.56 g/10 min. |
| Extrusion Rate | 72.6 lb/hr (33 kg/hr) | 85.7 lb/hr (38.9 kg/hr) 82.5 lb/hr (37.5 kg/hr) (at 3% additive) |
| Relative Thermo- | 1 | 2.08 |
| forming Window | | 1.44 (at 3% additive) |
| Recoverable Compliance | $8.9 \times 10^{-5}$ cm$^2$/dyne | $19.5 \times 10^{-5}$ cm$^2$/dyne |

The recoverable compliance appears to relate directly to the ability to resist sag; a higher value for the compliance of the blend correlates with a lower sag value and with better thermoforming properties.

Example 18

The preparation of Example 16 is repeated but with substitution of 1,1-bis(tert-butylperoxy)3,3,5-trimethylcyclohexane, half-life 18.6 minutes at 125° C. In this example, the temperature is raised directly to 125° C. at a rate exceeding 2° C./minute. The resulting segment copolymer exhibits good resistance to sag at the 2% level in polypropylene.

Example 19

In this example are reported data on sag resistance of polypropylene when modified by block copolymers of styrene and a hydrogenated conjugated diene polymer block. Such hydrogenated diene polymer blocks are "polyolefins", but are not prepared by the polymerization of a mono-olefin. Thus a block from hydrogenated polyisoprene has the units

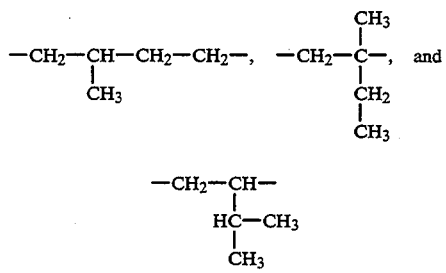

and a block from hydrogenated polybutadiene has the units

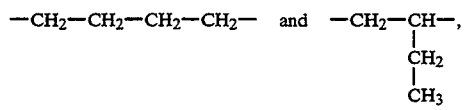

resembling a copolymer of ethylene and butene-1.

The materials used in this comparison are:
a. Polypropylene homopolymer, MFR-4, no additive
b. PP, 4% 30% styrene/70% butadiene block copolymer, 80% diblock, 20% triblock
   PP, 4% diblock copolymer, 37% styrene, 63% hydrogenated polyisoprene
   PP, 4% triblock copolymer, 29% styrene, 71% hydrogenated butadiene
   PP//methyl methacrylate segmented copolymer, Example 69 of U.S. Pat. No. 4,957,974.

The graft copolymer of the present invention is not evaluated in this series. However, it is fully anticipated by much cross-comparative work with Example 29-E that a sag slope value of less than 0.02 would be obtained.

The blends are mixed on a two-roll mill at 195° C. First the polypropylene is placed on the mill and processed to a smooth rolling bank. Then the modifier candidate is added to the mill and the material is blended for five minutes. The material is transferred to a preheated mold (0.15×24×24 cm plaque) and pressed at 195° C. for three minutes. The mold is then transferred to a cold press and cooled under pressure. A 10 cm×10 cm square is cut from the plaque and clamped into the sag frame. The sample is then transferred to a 190 degree oven with a glass window for observation of sag. The amount of sag as a function of time is measured.

| Test | Formulation | | | | |
| --- | --- | --- | --- | --- | --- |
| | A | B | C | D | E |
| Time to Sag 1 inch (25.4 mm) | 8:32 | 7:11 | — | 8:21 | 26:49 |
| Time to Sag 2 inch (50.8 mm) | 10:50 | 9:30 | 8:52 | 10:50 | —* |
| Sag slope | 0.30 | 0.30 | 0.29 | 0.26 | 0.022 |

*Value for 2 minutes beyond length of time of experiment

The following examples illustrate preparation of the segmented copolymer by the process of the invention. In all cases, the polypropylene homopolymer used in the synthesis had a melt flow rate ca. 4; where noted, the polypropylene as supplied had a porous structure. The polypropylene used in the sag test also had a mfr of 4.

Preparations of PP-PS with Different Initiators

Example 20

With tert-butyl peroxybenzoate:

The initiator tert-butyl peroxybenzoate (0.5 g, 2.57 mmoles) is added to the polypropylene (175 g, 4.13 moles, porous) in a 500 ml round bottomed flask followed by the styrene monomer (18.4 g, 0.177 moles). The flask is then placed on a rotary evaporator and the system purged with nitrogen for 5 minutes. The purging is followed by rotation of the flask on the rotary evaporator for 1 minute and then another 5 minute purge with nitrogen.

Then while the flask is rotating on the rotary evaporator the temperature of the reaction mixture is raised to 140° C. at a rate of 2.1° C./min by means of an oil bath under the 500 ml flask. The temperature is maintained at 140° C. for 2 hours and then the still free flowing beads dried overnight at 70° C. under vacuum to yield 192 g of product.

The product is blended into polypropylene at 4% and a 60 mil (1.52 mm) plaque prepared as described previously. A piece from the plaque is tested by the sag test and found to sag only ¼" in 30 minutes, i.e., its sag slope value would be <<0.02.

Example 21

With dicumyl peroxide:

A) The styrene monomer (18.4 g, 0.18 moles) and dicumyl peroxide initiator (0.69 g, 2.57 mmoles) are premixed and then added to the polypropylene (175 g, 4.13 moles, porous) in a 500 ml round bottomed flask. The round bottomed flask is placed on a rotary evaporator. The entire system is purged with nitrogen for 5 minutes followed by a rotation for 1 minute and a further 5 min purge with nitrogen.

The temperature of the reaction mixture is raised to 151° C. at a rate of 1.5° C./min by means of an oil bath. The temperature is held at 151° C. for a further 2 hours and then the product dried overnight at 60° C. under vacuum to yield 193.2 g of product. The sag slope of the product is 0.21 when milled into polypropylene at 4%.

B) The styrene monomer (19.4 g, 0.19 moles) and the dicumyl peroxide initiator (0.45 g, 1.65 mmoles) are premixed and deoxygenated by bubbling nitrogen through for 15 minutes. The monomer—initiator mixture is then pumped onto the polypropylene (175 g, 4.13 moles, porous) which is under an inert atmosphere in a 500 ml resin kettle.

The reaction temperature is raised to 150° C. by means of a heating mantle at a rate of 2.2° C./min. The reaction mixture is held at this temperature for 2 hours and then is dried at 60° C. overnight to yield 192.4 g of free flowing product whose sag slope is measured at 0.16 when blended at 4% into polypropylene.

Example 22

With tert-butyl peroxyisobutyrate:

Styrene monomer (27.3 g, 0.26 moles) and tert-butyl peroxyisobutyrate (0.51 g, 2.37 mmoles) initiator are premixed and deoxygenated by bubbling nitrogen through for 10 minutes. The monomer and initiator solution is then pumped into the polypropylene (175 g, 4.13 moles, porous) which is under a nitrogen atmosphere in a 500 ml resin kettle.

The reaction temperature is raised to 116° C. at a rate of 1° C./min by means of a heating mantle and held at this temperature for 2 hours. The final material, 199.9 g of still free flowing beads is isolated following drying at 60° C. overnight.

The product is milled at 4% into polypropylene and a plaque prepared in the usual manner. The measured sag slope is 0.21.

Example 23

With tert-butyl peroctoate:

In this experiment the styrene monomer (27,3 g, 0.26 moles) and the initiator tert-butyl peroctoate (0.56 g, 2.57 mmoles) are premixed and deoxygenated as before and then pumped onto the polypropylene (175 g, 4.13 moles, porous) which is in a 500 ml resin kettle. The temperature is raised to 106° C. at a rate of 0.8° C./min by means of a heating mantle and held there for 2 hours. The product is dried overnight at 60° C. to yield 199 g of material. The product is tested as above and its sag slope is 0.20.

Example 24

With benzoyl peroxide

The reaction is carried out in the same manner as with tert-butyl peroxybenzoate except that the monomer and initiator are premixed before addition to the polypropylene since in this case the initiator is a solid. Thus in this reaction the styrene monomer (27.3 g, 0.26 moles) and benzoyl peroxide initiator (0.62 g, 2.57 mmoles) are premixed and added to the polypropylene (175 g, 4.13 moles, porous) and the reaction carried out in a 500 ml round bottomed flask on a rotary evaporator. The temperature is raised to 104° C. at a rate of 2.7° C./min by means of an oil bath and held at this temperature for 2 hours before isolating 199.7 g of product after drying overnight. Sag slope is 0.21 at 4% into polypropylene.

Example 25

With Di-tert-Butyl Peroxide:

Styrene monomer (17.50 g, 0.168 moles) and di-tert-butyl peroxide (0.24 g, 1.65 mmoles) are, mixed together, stirred and deoxygenated by bubbling nitrogen through for 5 minutes. Then the initiator-monomer mixture is pumped rapidly (over 5 minutes) onto the polypropylene (175 g, 4.13 moles) which is in a 500 ml resin kettle under nitrogen.

The reaction mixture is stirred while the temperature is raised to 155° C. at a rate of 2.7° C./Min by means of a heating mantle. This reaction is maintained at 155° C. for a further 2 hours and then the material dried overnight at 60° C. under vacuum to yield 188.2 g of product. This product is milled into polypropylene at 4% and the sag slope of the resulting plaque is 0.09.

Example 26

With 1,1-di-(tert-butyl-peroxy)-3,3,5-trimethylcyclohexane:

A) Styrene monomer (18.4 g, 0.18 moles) and initiator (0.39 g, 1.28 mmoles) are mixed together and added to a 500 ml round bottomed flask containing the polypropylene (175 g, 4.13 moles). The round bottomed flask is placed on a rotary evaporator and evacuated to a vacuum of 20 inches (ca. 500 mm) of Hg. The vacuum is released into nitrogen. The evacuation and releasing is repeated three times and the reaction mixture is heated to 127° C. at a rate of 1.7° C./mm. The temperature is then maintained at 127° C. for a further 2 hours and then the material is dried overnight at 60° C. to yield 192.9 g of product.

The sag slope of this material is 0.028 when blended into polypropylene at 4%.

B) Styrene monomer (27.27g, 0.26 moles) and initiator (0.39 g, 1.28 mmoles) are premixed and added to the polypropylene (175 g, 4.13 moles) followed by evacuation and inertion as before. The temperature is raised to 140° C. at a rate of 2.6° C./min and maintained at this temperature for 40 min. The material is dried at 60° C. overnight to yield 200 g of product.

The sag slope of this material is 0.023 when blended into polypropylene at 4%.

Example 27

In the following table are compared the sag values of various segmented copolymers and the one-hour half-life of the initiators used.

| Initiator | Example | One-hour half-life, °C. | Sag Resistance? |
|---|---|---|---|
| Benzoyl peroxide | 24 | 92 | No |
| tert-Butyl peroxyoctoate | 23 | 95 | No |
| tert-Butyl peroxyisobutyrate | 22 | 102 | No |
| 1,1-Di-(tert-butyl-peroxy)-3,3,5-trimethylcyclohexane | 26 | 115 | Yes |
| tert-Butyl peroxybenzoate | 20 | 125 | Yes |
| Dicumyl peroxide | 21 | 137-9 | No |
| Di-tert-butyl peroxide | 25 | 149 | Moderate* |
| Control (PP homopolymer) | | | No** |

*Melt strength ratio = 2.3
**Sag value = 0.21

Example 28

Blends of Polypropylene and Polystyrene.

Blends of polypropylene (mfr=4) and polystyrene (Dow Styron 685D, $M_w$ 330,000) are prepared on the mill roll and plaques pressed afterwards in the usual manner. The blends are produced in the absence and in the presence of a PP-PS copolymer which is prepared with the aid of the initiator benzoyl peroxide (Example 24).

| Blend | Blend Components | Sag Slope |
|---|---|---|
| 1. | 50 g Polypropylene + 50 g polystyrene | 0.09 |
| 2. | 50 g Polypropylene + 50 g polystyrene + 4 g (Example 26) | 0.07 |
| 3. | 80 g Polypropylene + 20 g polystyrene | 0.23 |
| 4. | 80 g Polypropylene + 20 g polystyrene + 4 g (Example 26) | 0.16 |
| 5. | 100 g Polystyrene | <0.02 |

This example shows that certain segmented copolymers of the present invention which do not show good sag resistance in polypropylene can produce improved sag resistance (over a similar blend with no compatibilizer) when used to compatibilize fairly large amounts of polystyrene with polypropylene.

Example 29

Production of Segmented Copolymer in a Reactor with Baffles

Polypropylene (23.5 Kg, mfr=4) is added to a 2.2 Cu. Ft. (62.3 l.) Porcupine Processor (The Bethlehem Corporation, Easton, Pa., USA), which is a reactor equipped with stirring paddles and many small baffles, followed by styrene monomer (2.45 Kg) and then t-butyl peroxybenzoate initiator (67.1 g).

The reactor is sealed and then inerted by evacuating to 30 inches Hg (760 mm.) and then filling with nitrogen to atmospheric pressure. The evacuation and release into nitrogen is done three times in succession.

The reactor contents are heated at atmospheric pressure at a rate of 3° C./Min to a final temperature of 140° C. The reactor is equipped with a water cooled condenser. Heating is accomplished by means of high pressure steam passing through the stirring paddles. This reaction temperature is maintained for 2 hours. After this time, the steam heating is removed and the reactor pressure is reduced from atmospheric to 30 inches Hg (760 mm.). The reactor contents are dried in this manner for 2.5 hours and then the product (25.5 Kg) collected.

The sag slope of this material in a blend with polypropylene is measured in the usual manner and the plaque sags to less than ½" (12.7 mm.) in 25 minutes. This value correlates to a melt strength ratio of at least 5.

Examples 30 and 31

These examples illustrate the importance of the heat-up rate and should be compared with Examples 20 and 26. Although segmented copolymer of polypropylene and polystyrene is formed, the resulting polymers, when prepared at a low heat-up rate, are much less effective in controlling sag when blended with polypropylene.

For Example 30, the polypropylene (175g, 4.1 moles) is added to a 500 ml round bottomed flask and inerted with nitrogen. The styrene monomer (18.4 g, 0.17 moles) and t-butyl peroxybenzoate initiator (0.5 g, 2.57 mmoles) are combined and deoxygenated by bubbling nitrogen through for about 15 minutes. Then the monomer and initiator solution are pumped onto the polypropylene under nitrogen. The temperature of the reaction mixture is raised to 142° C. at a rate of 0.5° C./Min. The temperature is held at close to 140° C. for 2 hours and then dried. The sag slope of the product is measured at 4% in polypropylene and shown to be 0.14 (melt strength ratio=1.5). In a similar manner (Example 31), a product is prepared from polypropylene (175 g), styrene (18.4 g), and the initiator 1,1 bis (tert-butylperoxy)-3,3,5-trimethylcyclohexane (0.388 g, 1.28 mmoles). However with this initiator, the temperature is raised to 127° C. at a rate of 0.6° C./Min. The sag slope of this product is measured at 4% in polypropylene and shown to be 0.21 (melt strength ratio=1.0).

Example 32

A blend of polypropylene (mfr=4) and polystyrene (similar to that used in Example 28) is prepared at a 7:3 ratio. Addition of 5.5 weight-percent of a segmented copolymer similar to that of Example 29 doubles the elongation at break, with slight improvement in impact strength and tensile modulus, but with some lowering of tensile stress at break.

Example 33

To a blend of 20 parts poly(phenylene oxide) and 80 parts polypropylene (mfr=4) is added 5.5 or 9 parts of the segmented copolymer similar to that of Example 29. A slight increase in tensile modulus is seen. Blends where the ratio of the matrix polymer is 50:50 or 40:60 may also be prepared with the segmented copolymer.

Example 34

In a manner similar to Example 33, blends of polycarbonate/polypropylene (70/30 or 80/20) may be modified with up to 10 parts of the segmented copolymer of Example 29.

What is claimed is:

1. A process for preparing a segmented copolymer of polypropylene or polyethylene with polystyrene which segmented copolymer is essentially free of ungrafted polystyrene and which imparts improved melt strength to polypropylene which comprises:
   (a) mixing the polypropylene or polyethylene with styrene (and optionally up to about 20% by weight, based on total monomer content, of one or more monomers copolymerizable with styrene) in the presence of an initiator having a one-hour half-life at a temperature in the range of from about 110° C. to about 125° C.;
   (b) heating the mixture at a rate of at least 1° C./minute to a temperature of at least 90° C. at which the polypropylene or polyethylene completely swells; and
   (c) continuing heating at a rate of at least 1° C./minute to at least 140° C. until grafting occurs.

2. The process of claim 1 wherein the mixture contains polypropylene, and wherein the mixture is heated directly to a temperature of at least 140° C.

* * * * *